United States Patent
Kimura

(10) Patent No.: US 9,298,255 B2
(45) Date of Patent: Mar. 29, 2016

(54) TRANSMISSIVE DISPLAY APPARATUS AND OPERATION INPUT METHOD

(71) Applicant: SEIKO EPSON CORPORATION, Tokyo (JP)

(72) Inventor: Fusashi Kimura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 469 days.

(21) Appl. No.: 13/686,450

(22) Filed: Nov. 27, 2012

(65) Prior Publication Data

US 2013/0135197 A1 May 30, 2013

(30) Foreign Application Priority Data

Nov. 28, 2011 (JP) ................................. 2011-258699

(51) Int. Cl.
| | |
|---|---|
| *G06F 3/01* | (2006.01) |
| *G06F 3/03* | (2006.01) |
| *G06F 3/0488* | (2013.01) |

(52) U.S. Cl.
CPC ................ *G06F 3/01* (2013.01); *G06F 3/0308* (2013.01); *G06F 3/04886* (2013.01); *G06F 2203/04808* (2013.01)

(58) Field of Classification Search
CPC ........................... G06F 3/0308; G06F 3/04886
USPC .......................................... 345/7–9, 156–184
See application file for complete search history.

(56) References Cited

U.S. PATENT DOCUMENTS

| | | | | |
|---|---|---|---|---|
| 6,304,234 | B1* | 10/2001 | Horiuchi | 345/8 |
| 2002/0060648 | A1* | 5/2002 | Matsui et al. | 345/8 |
| 2010/0103078 | A1 | 4/2010 | Mukawa et al. | |
| 2010/0156836 | A1 | 6/2010 | Katayama | |
| 2010/0225566 | A1* | 9/2010 | Sato | 345/8 |
| 2011/0158478 | A1* | 6/2011 | Yamada et al. | 382/103 |
| 2011/0234476 | A1* | 9/2011 | Sugihara et al. | 345/8 |

FOREIGN PATENT DOCUMENTS

| | | |
|---|---|---|
| JP | 2005-352288 A | 12/2005 |
| JP | 2006-276748 A | 10/2006 |
| JP | A-2008-020770 | 1/2008 |
| JP | B2-4055283 | 3/2008 |

(Continued)

OTHER PUBLICATIONS

Jan. 21, 2016 Office Action issued in U.S. Appl. 14/950,824.

*Primary Examiner* — Carolyn R Edwards
(74) *Attorney, Agent, or Firm* — Oliff PLC

(57) ABSTRACT

A transmissive display apparatus includes an operation section that detects an operational input issued through an operation surface, an image output section for the left eye and an image output section for the right eye that output predetermined image light, an image pickup section that visually presents the predetermined image light in an image pickup area that transmits externally incident light, a sensor that outputs a signal according to a positional relationship between the operation surface and the image pickup area, and a determination section that detects overlap between an optical image of the operation surface that has passed through the image pickup area and the predetermined image in the image pickup area based on the signal according to the positional relationship and receives the operational input when the optical image of the operation surface overlaps with the predetermined image.

7 Claims, 11 Drawing Sheets

(56) References Cited

FOREIGN PATENT DOCUMENTS

| JP | 2010-145861 A | 7/2010 |
| JP | A-2010-231290 | 10/2010 |
| JP | B2-4636164 | 2/2011 |
| JP | 2011-186856 A | 9/2011 |
| WO | WO 2009/041055 | 4/2009 |

* cited by examiner

TRANSMISSIVE DISPLAY APPARATUS AND OPERATION INPUT METHOD

BACKGROUND

1. Technical Field

The present invention relates to a transmissive (see-through-type) display apparatus and an operation input method.

2. Related Art

JP-A-2010-231290 discloses a display apparatus (head mounted display) that uses an intuitive interface for operation.

When an icon image or any other image that can be pressed by a user is displayed in an image pickup area of the display apparatus disclosed in JP-A-2010-231290, however, the user who wears the display apparatus around the head cannot touch the icon image, which is a virtual image, and hence experiences an odd sensation in the pressing operation of the icon image. The display apparatus disclosed in JP-A-2010-231290 thus has a problem of degraded operability.

SUMMARY

An advantage of some aspects of the invention is to provide a transmissive display apparatus that excels in operability and an operation input method.

An aspect of the invention relates to a transmissive display apparatus including a mobile operation section that detects an operational input issued through an operation surface, an image output section that outputs predetermined image light, an image pickup section that visually presents the predetermined image light in an image pickup area that transmits externally incident light, a sensor that outputs a signal according to a positional relationship between the operation surface and the image pickup area, and a determination section that detects overlap between an optical image of the operation surface that has passed through the image pickup area and the predetermined image light in the image pickup area based on the signal according to the positional relationship and receives the operational input when the optical image of the operation surface overlaps with the predetermined image light.

In the configuration described above, the determination section determines to receive the operational input when the optical image of the operation surface overlaps with the predetermined image light, whereby, for example, the user can hold a track pad in such a way that the track pad overlaps with an icon image in the image pickup area of the transmissive display apparatus and can operate the track pad as if it were a touch panel. That is, the operability of the transmissive display apparatus can be improved. Further, the transmissive display apparatus can prevent misoperation associated with an operational input using a virtual icon image.

Another aspect of the invention relates to the transmissive display apparatus according to the above aspect of the invention, wherein the determination section detects overlap between the optical image of the operation surface and the predetermined image light and receives the operational input issued by using the overlap.

In the configuration described above, the determination section detects overlap between the optical image of the operation surface and the predetermined image and receives only the operational input issued by using the overlap, whereby the transmissive display apparatus can provide operability similar to that of a touch panel even when the optical image of the operation surface overlaps with only part of the predetermined image.

Still another aspect of the invention relates to the transmissive display apparatus according to the above aspect of the invention, wherein the determination section determines whether or not the operation surface faces the image pickup area and receives the operational input when the operation surface faces the image pickup area.

In the configuration described above, the determination section determines whether or not the operation surface faces the image pickup area based on the signal according to the positional relationship. When the operation surface faces the image pickup area, the determination section determines to receive the operational input. The operability of the transmissive display apparatus can thus be improved. That is, the transmissive display apparatus can prevent misoperation associated with an operational input using a virtual icon image.

Yet another aspect of the invention relates to the transmissive display apparatus according to the above aspect of the invention, wherein the sensor captures an image of the operation surface, and that the determination section detects overlap in the image pickup area based on the image of the operation surface captured by the sensor.

In the configuration described above, the determination section detects overlap in the image pickup area based on an image of the operation surface captured, by the sensor, whereby the operability of the transmissive display apparatus can be improved.

Still yet another aspect of the invention relates to the transmissive display apparatus according to the above aspect of the invention, wherein the operation section or the image output section includes a light source, that when the light source is provided in the operation section, the sensor receives light from the light source on the side where the image output section is present and outputs a signal according to the received light, whereas when the light source is provided in the image output section, the sensor receives light from the light source on the side where the operation section is present and outputs a signal according to the received light, and that the determination section detects overlap in the image pickup area based on the signal according to the received light.

In the configuration described above, the determination section detects overlap in the image pickup area based on a signal according to the light from the light source, whereby the operability of the transmissive display apparatus can be improved.

Further another aspect of the invention relates to the transmissive display apparatus according to the above aspect of the invention, wherein the operation section is a track pad.

In the configuration described above, the track pad detects an operational input issued through the operation surface, whereby the operability of the transmissive display apparatus can be improved. That is, the transmissive display apparatus can provide operability similar to that of a touch panel by using the track pad.

Still further another aspect of the invention relates to the transmissive display apparatus according to the above aspect of the invention, wherein the transmissive display apparatus further includes a projection optical system that projects the predetermined image light and a light guide section that guides the predetermined image light projected through the projection optical system to the image pickup area, and that the determination section detects overlap viewed from an observation position between the optical image of the operation surface and the predetermined image light guided through the light guide section and receives the operational input issued by using the overlap.

In the configuration described above, the determination section detects observed overlap between the optical image of the operation surface and the predetermined image light and receives the operational input issued by using the overlap, whereby the transmissive display apparatus can provide operability similar to that of a touch panel even when the optical image of the operation surface overlaps with only part of the predetermined image light.

Yet further another aspect of the invention relates to an operation input method used with a transmissive display apparatus. The method includes outputting predetermined image light by using an image output section, visually presenting the predetermined image light in an image pickup area that transmits externally incident light by using an image pickup section, outputting a signal according to a positional relationship between the operation surface and the image pickup area by using a sensor, detecting an operational input issued through the operation surface by using a mobile operation section, and detecting overlap between an optical image of the operation surface that has passed through the image pickup area and the predetermined image light in the image pickup area based on the signal according to the positional relationship and receiving the operational input when the optical image of the operation surface overlaps with the predetermined image light by using a determination section.

In the method described above, the determination section determines to receive the operational input when the optical image of the operation surface overlaps with, the predetermined image light, whereby, for example, the user can hold a track pad in such a way that the track pad overlaps with an icon image in the image pickup area of the transmissive display apparatus and can operate the track pad as if it were a touch panel. That is, the operability of the transmissive display apparatus can be improved. Further, the transmissive display apparatus can prevent misoperation associated with an operational input using a virtual icon image.

According to the aspects of the invention, the transmissive display apparatus receives an operational input when an optical image of the operation surface overlaps with a predetermined image, whereby the operability of the transmissive display apparatus can be improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
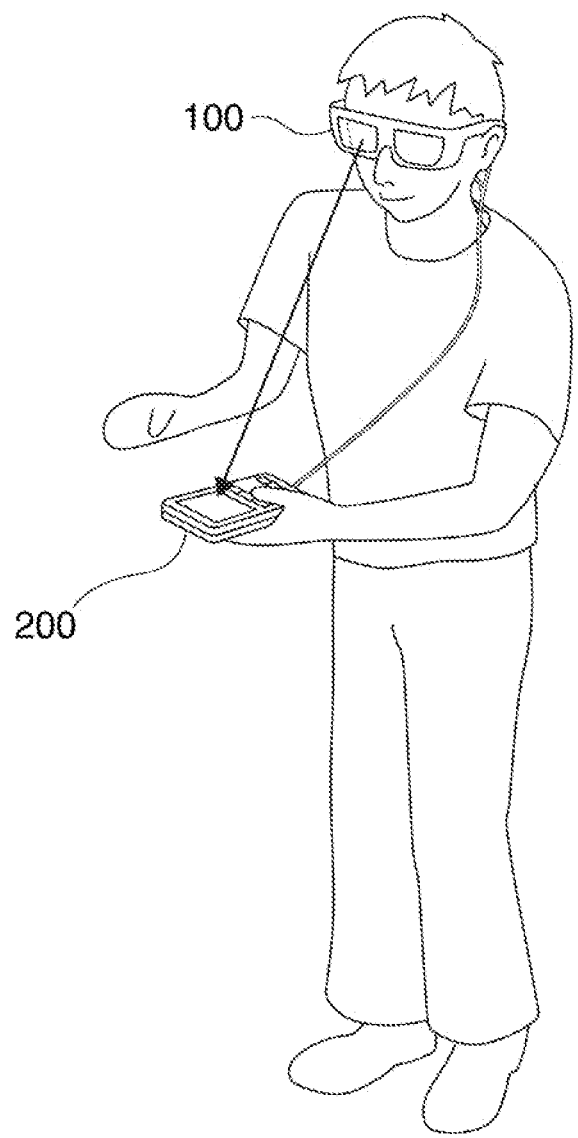
FIG. 1 shows a transmissive display apparatus and a user who is using the transmissive display apparatus in a first embodiment of the invention.

A first embodiment of the invention will be described in detail with reference to the drawings. FIG. 1 shows a transmissive display apparatus and a user who is using the transmissive display apparatus. The transmissive display apparatus (transmissive head mounted display) includes a display apparatus 100 and a control apparatus 200 (controller).

A user who wears the display apparatus 100 (of eyeglass type) around the head can view a predetermined image (icon image, menu image, for example) displayed in an image pickup area of an image pickup section of the display apparatus 100. The image pickup area of the display apparatus 100 is configured to transmit at least part of the incident light, whereby the user can view the control apparatus 200 through the image pickup area of the display apparatus 100 with the display apparatus 100 worn around the head. That is, the user can simultaneously observe an optical image formed by the incident light and the displayed predetermined image with both eyes, the positions of which are called observation positions. The user can further issue an operational input by using an operation surface of the control apparatus 200, which is held and moved by hand.

Figure 2:
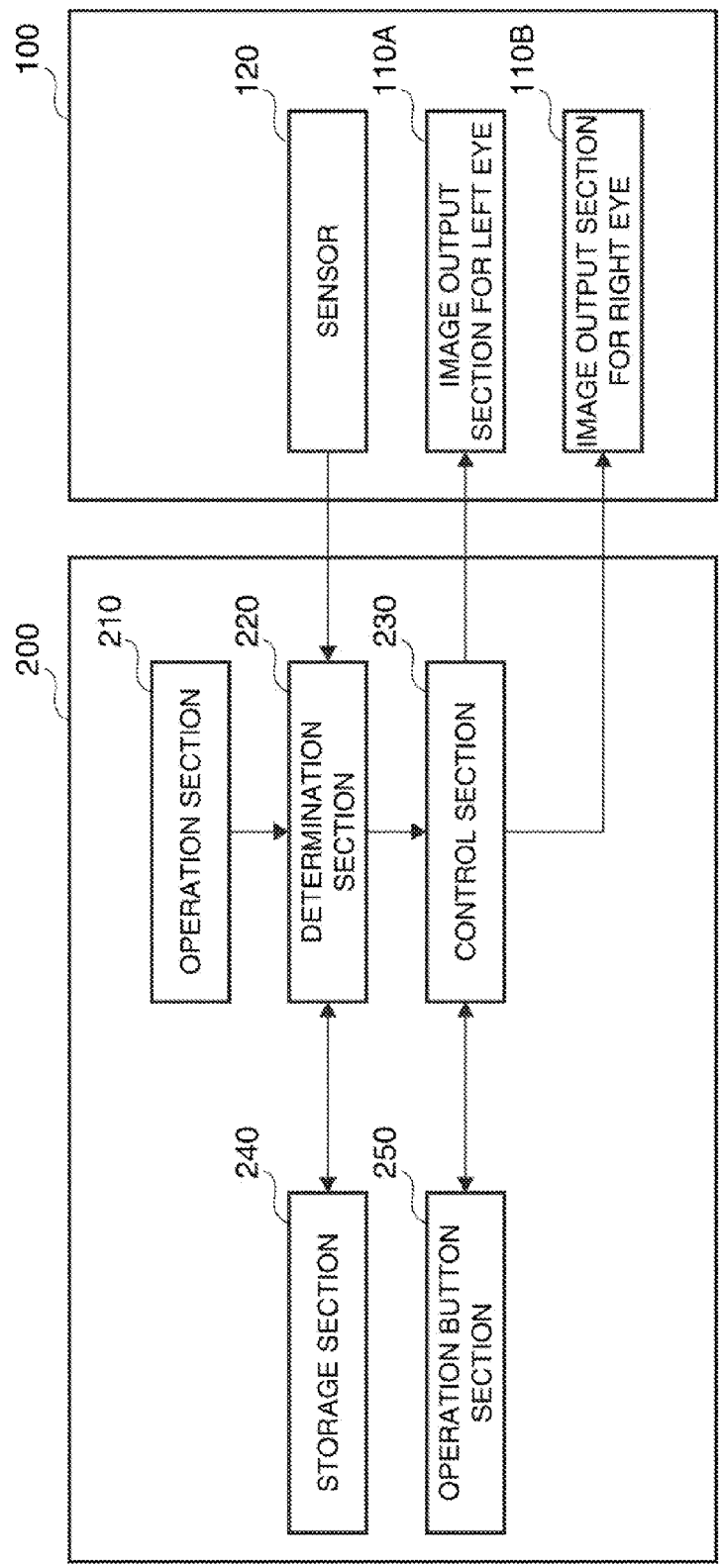
FIG. 2 is a block diagram showing an example of the configuration of the transmissive display apparatus in the first embodiment of the invention.
Figure 3:
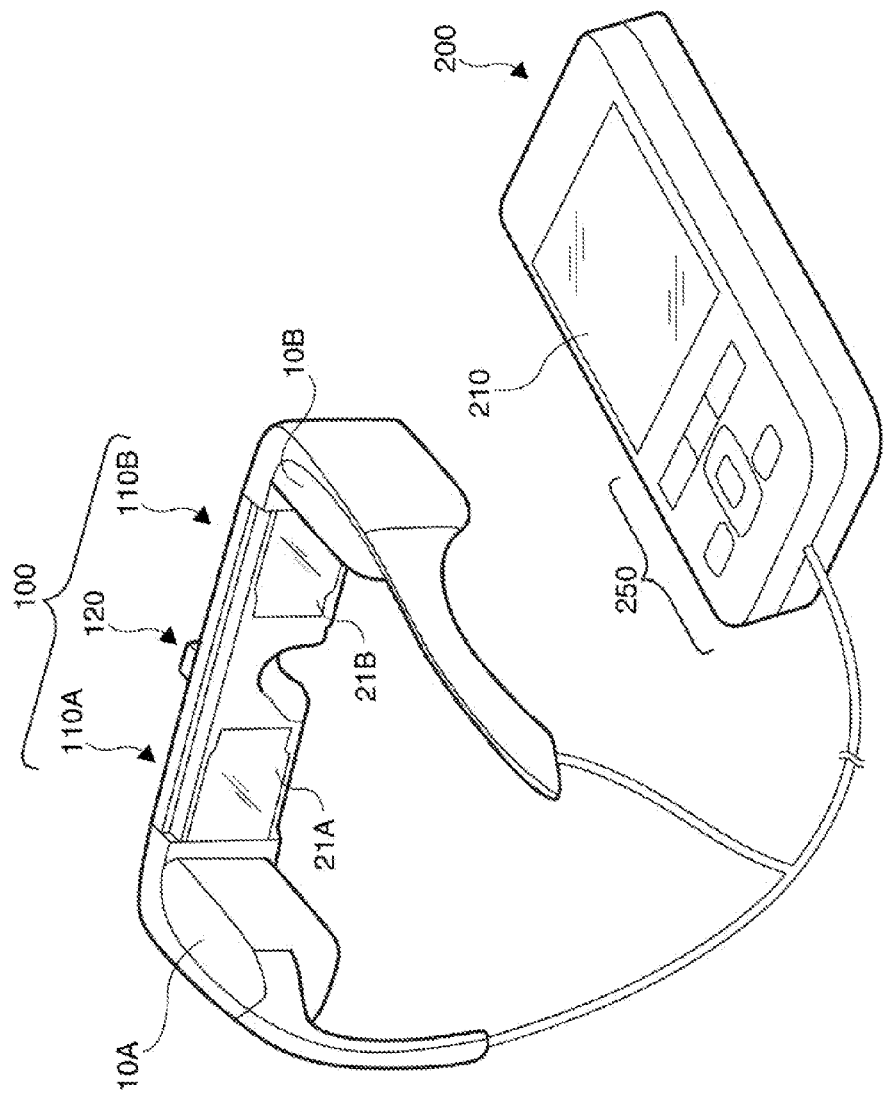
FIG. 3 is an exterior view showing the transmissive display apparatus in the first embodiment of the invention.

FIG. 2 is a block diagram showing an example of the configuration of the transmissive display apparatus. FIG. 3 is an exterior view showing the transmissive display apparatus. The display apparatus 100 includes an image output section for the left-eye 110A, an image output section for the right-eye 110B, and a sensor 120.

The image output section for the left-eye 110A includes an image formation section for the left eye 10A and an image pickup section 21A. The image formation section for the left eye 10A is so disposed in a left temple of the display apparatus 100 that the image formation section for the left eye 10A is located on the left to the head of the user who wears the display apparatus 100. An image signal is inputted from the control apparatus 200 to the image formation section for the left eye 10A, which forms predetermined image light for the left eye of the user and outputs the thus formed predetermined image light to the image pickup area of the image pickup section 21A.

The predetermined image for the left eye of the user is displayed in the image pickup area of the image pickup section 21A. The image pickup section 21A is so disposed in a left rim of the display apparatus 100 that the image pickup section 21A is located in front of the left eye of the user who wears the display apparatus 100. The image pickup area of the image pickup section 21A is configured to transmit at least part of the incident light, whereby an optical image formed by the incident light is guided, to the left eye of the user.

The image output section for the right-eye 110B includes an image formation section for the right eye 10B and an image pickup section 21B. The image formation section for the right eye 10B is so disposed in a right temple of the display apparatus 100 that the image formation section for the right eye 10B is located on the right to the head of the user who wears the display apparatus 100. An image signal is inputted from the control apparatus 200 to the image formation section for the right eye 10B, which forms predetermined image light for the right eye of the user and outputs the thus formed predetermined image light to the image pickup area, of the image pickup section 21B.

The predetermined image for the right eye of the user is displayed in the image pickup area of the image pickup section 21B. The image pickup section 21B is so disposed in a right rim of the display apparatus 100 that the image pickup section 21B is located in front of the right eye of the user who wears the display apparatus 100. The image pickup area of the image pickup section 21B is configured to transmit at least part of the incident light, whereby an optical image formed by the incident light is guided, to the right eye of the user.

Figure 4:
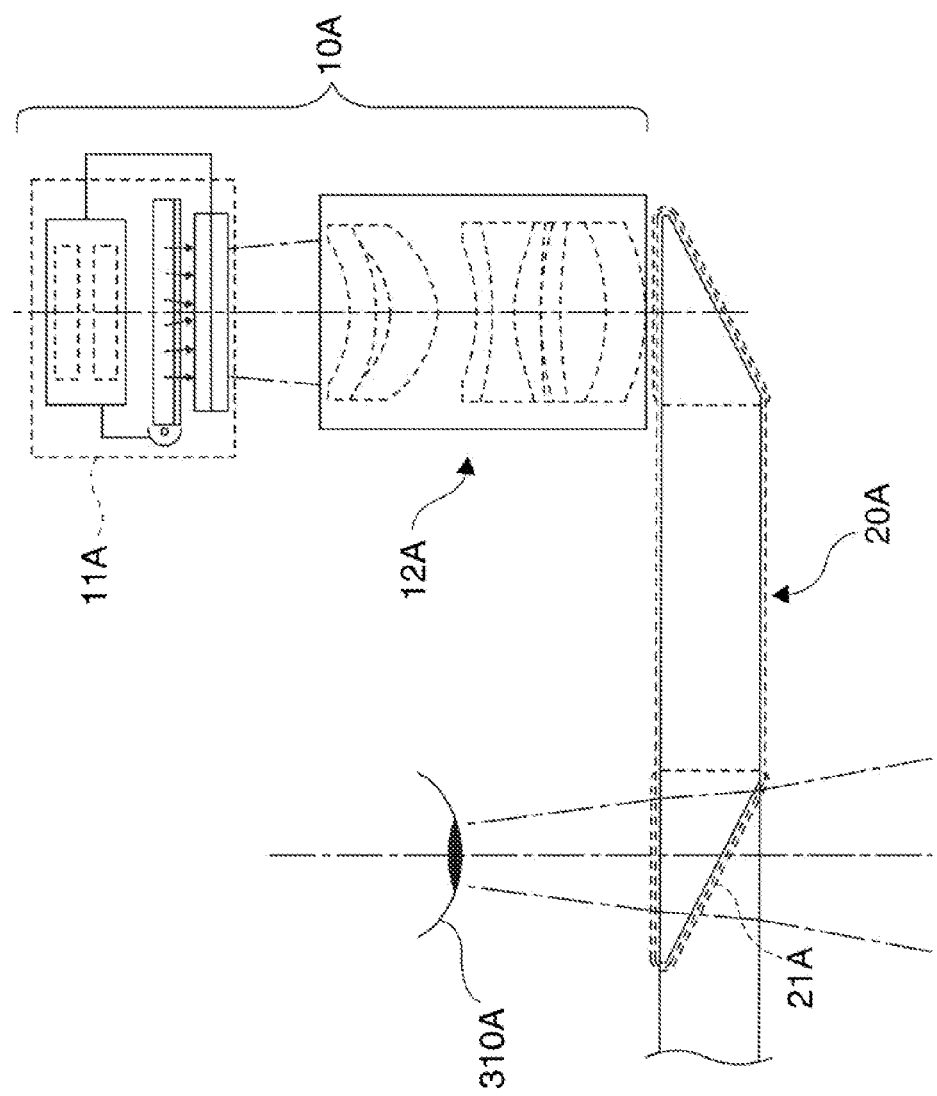
FIG. 4 is a plan view showing an example of the configuration of the display apparatus in the first embodiment of the invention.

FIG. 4 is a plan view showing an example of the configuration of the display apparatus. The image output section for the left-eye 110A and the image output section for the right-eye 110B are configured in a bilaterally symmetric manner, and only an example of the configuration of the image output section for the left-eye 110A will therefore be described.

The image output section for the left-eye 110A includes the image formation section for the left eye 10A and a light guide section for the left eye 20A. The image formation section for the left eye 10A includes an image generation section 11A and a projection optical system 12A. The image generation section 11A includes a light source (light emitting diode: LED, for example) and a light modulator (liquid crystal display device, for example) for each color emission.

An image signal is inputted from the control apparatus 200 to the image generation section 11A. In the image generation section 11A, an optical system diffuses red light, green light, and blue light emitted from the light sources and projects the diffused light onto the light modulators. The light modulators spatially modulate the red light, the green light, and the blue light in accordance with the image signal inputted from the control apparatus 200 and outputs image light according to the image signal. The projection optical system 12A converts the image light outputted from the light modulators into a parallelized light flux.

The light guide section for the left eye 20A projects the image light, which is the light flux parallelized by the projection optical system 12A, onto the image pickup area formed on a surface of the image pickup section 21A (triangular prism, for example) provided in the light guide section for the left eye 20A. The surface of the image pickup section 21A has front and rear sides, and one of the sides (image pickup area) that faces a left eye 310A of the user who wears the display apparatus 100 has a mirror layer or any other reflection coating formed thereon. The image light projected onto the image pickup area of the image pickup section 21A undergoes total reflection at the surface having the reflection coating and is directed toward the left eye 310A of the user, whereby a predetermined image (icon image, for example) is displayed in the image pickup area of the image pickup section 21A. On the other hand, at least part of the light externally incident on the image pickup section 21A passes through the image pickup area of the image pickup section 21A and is guided to the left eye 310A of the user, whereby the user can view the predetermined image formed by the image formation section for the left eye 10A and an optical image formed by the incident light superimposed on the predetermined image in the image pickup area of the image pickup section 21A.

Refer to FIGS. 2 and 3 again and resume the description of the example of the configuration and exterior appearance of the transmissive display apparatus. In the following sections, items common to the image pickup section 21A and the image pickup section 21B are described as "image pickup section 21" with the Roman reference characters omitted.

The sensor 120 is an imaging device that captures an image of an object external to the display apparatus 100. The sensor 120 is so disposed at a rim or a bridge of the display apparatus 100 that the sensor 120 is located in front of the head of the user who wears the display apparatus 100. That is, the sensor 120 is disposed in a position where it shows the exterior of the control apparatus 200 changing in appearance in accordance with the positional relationship between the display apparatus 100 and the control apparatus 200. For example, when the face of the user who wears the display apparatus 100 faces the control apparatus 200, the sensor 120 can capture an image of the exterior of the control apparatus 200 and output an image signal carrying the captured image.

The sensor 120 may be provided in a plurality of positions. In this case, the sensors 120 can capture images of the control apparatus 200 along a plurality of directions. Alternatively, the sensor 120 may be disposed on the control apparatus 200 instead of on the display apparatus 100, capture an image of the display apparatus 100 from the side where the control apparatus 200 is present, and output an image signal carrying the image of the display apparatus 100 captured by the sensor 120 (signal according to positional relationship).

The control apparatus 200 detects that the user has issued an operational input and determines whether or not it receives the detected operational input. When the control, apparatus 200 determines to receive the operational input, the control apparatus 200 controls the display apparatus 100 in accordance with the operational input. The control apparatus 200 includes an operation section 210, a determination section 220, a control section 230, a storage section 240, and an operation button section 250.

The storage section 240 stores in advance how an optical image of the operation surface of the operation section 210 that has passed through the image pickup area of the image pickup section 21 overlaps with a predetermined image (icon image, for example) in the image pickup area of the image pickup section 21 (hereinafter referred to as "overlap information") for each reference image of the control apparatus 200 that has been captured by the sensor 120.

The overlap information is detected based, on comparison between the reference images of the control apparatus 200 that have been, captured by the sensor 120 in advance and an image of the control apparatus 200 that has been captured by the sensor 120 during operation and will be described later in detail with, reference to FIGS. 6 to 8.

The operation button section 250 includes a group of operation buttons. Each of the operation buttons, when pressed by the user, outputs a signal representing a process related in advance to the pressed operation button to the control section 230. The process related in advance to a pressed button is, for example, a process of adjusting the brightness of an image displayed in the image pickup area of the image pickup section 21 (see FIG. 3).

The operation section 210 detects an operational input issued through the operation surface provided on an enclosure of the control, apparatus 200. More specifically, the operation section 210 detects the coordinates on the operation surface with which a finger of the user who is issuing an operational input is in contact. The operation section 210 is, for example, a track pad.

Figure 5B:
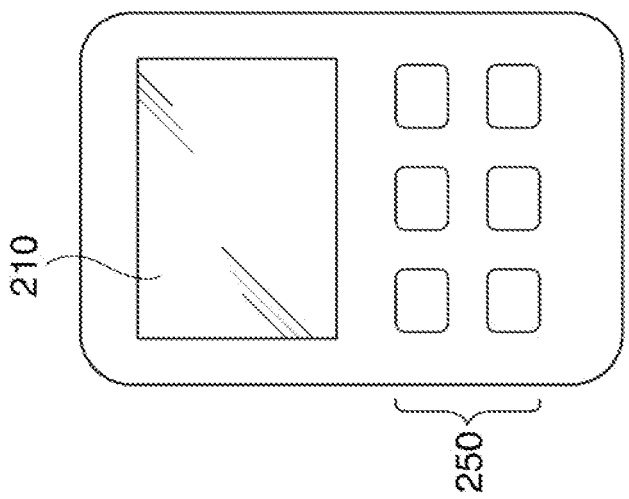
FIGS. 5A and 5B are exterior views of a control apparatus in the first embodiment of the invention.
Figure 5A:
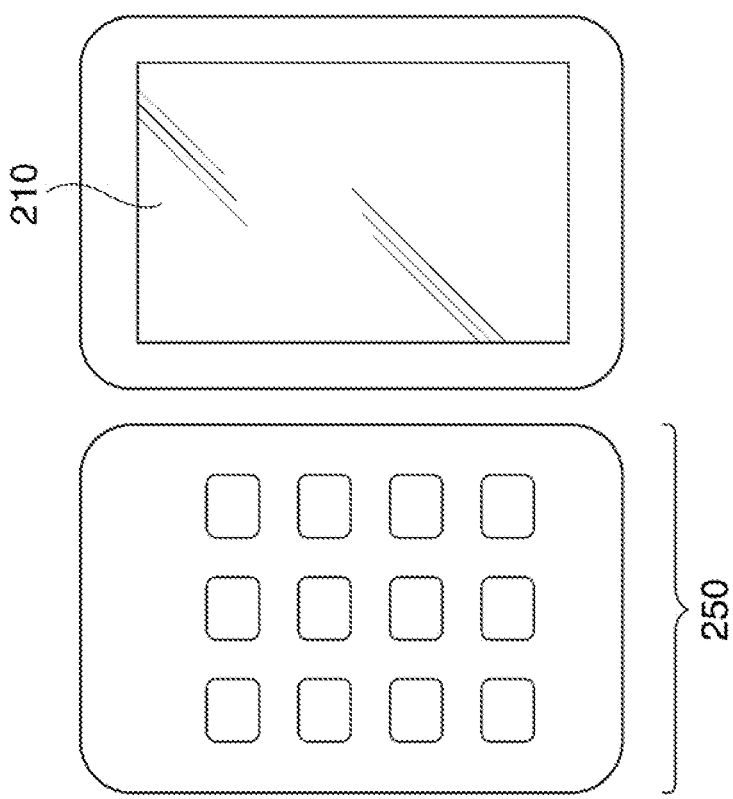

FIGS. 5A and 5B are exterior views of the control apparatus. The operation button section 250 is provided on one surface of the control apparatus 200, as shown in FIG. 5A. The operation section 210 (operation surface) is provided all over the other surface of the control apparatus 200. The operation section 210 and the operation button section 250 may alternatively be provided on one surface of the control apparatus 200, as shown in FIG. 5B. The description will, be continued below and made primarily on the operation section 210 (operation surface) shown in FIG. 5B by way of example.

Refer to FIG. 2 again and resume the description of the example of the configuration of the transmissive display apparatus. The determination section 220 detects overlay between an optical image of the operation surface of the operation section 210 that has passed through the image pickup area of the image pickup section 21 and a predetermined image (icon image, for example) in the image pickup area of the image pickup section 21 based on an image of the operation surface of the operation section 210 that has been captured by the sensor 120 (signal according to positional relationship).

The determination section 220 performs image matching between the image of the control apparatus 200 that has been just captured by the sensor 120 and a plurality of reference images stored in advance in the storage section 240. The determination section 220 then selects a piece of overlay information related to a reference image having been determined to most resemble the image of the control, apparatus 200 in the image matching from the pieces of overlay information stored in the storage section 240.

When the optical image of the operation surface of the operation section 210 overlaps with the predetermined image in the image pickup area of the image pickup section 21, the determination section 220 receives an operational input detected by the operation section 210.

Alternatively, the determination section 220 may determine whether or not the operation surface of the operation section 210 faces the image pickup area of the image pickup section 21 (see FIG. 3) based on the image of the operation surface of the operation section 210 that has been captured by the sensor 120 (signal according to positional, relationship), and when the operation surface of the operation section 210 faces the image pickup area of the image pickup section 21, the determination section 220 may receive an operational input detected by the operation section 210.

When a plurality of predetermined images (icon images, for example) are displayed in different positions in the image pickup area of the image pickup section 21, the determination section 220 may operate as follows: The determination section 220 detects overlap between an optical image of the operation surface of the operation section 210 and each of the predetermined images and receives only an operational input issued by using the overlap. The detection process will be described later in detail with reference to FIGS. 6 to 8.

Among the positions on the operation surface that receives an operational input, the determination section 220 detects the position on the operation surface at which an operational input has been actually issued and outputs information representing the position in the image pickup area of the image pickup section 21 that is related to the detected position on the operation surface to the control section 230.

When the determination section 220 detects no position in the image pickup area of the image pickup section 21 where a predetermined image that overlaps with an optical image of the operation surface of the operation section 210 is displayed, the determination section 220 may determine to receive no operational input at all detected by the operation section 210 (to prevent misoperation).

Whenever an operation button is pressed, the operation button section 250 inputs a signal corresponding to the pressed operation button to the control section 230, which carries out a predetermined process (process of adjusting brightness of image, for example) based on the inputted signal.

Further, among the positions (coordinates) on the operation surface at which the determination section 220 has determined to receive an operational input, the determination section 220 notifies the control section 230 of information representing the position in the image pickup area of the image pickup section 21 that is related to the position on the operation surface at which an operational input has been actually issued. The control section 230 carries out a process related to the position in the image pickup area of the image pickup section 21 that has been notified by the determination section 220 (process of reproducing music data, for example).

The control section 230 outputs image signals (icon images, content images, for example) to the image output section for the left-eye 110A and the image output section for the right-eye 110B of the display apparatus 100. An image signal outputted to the image output section for the left-eye 110A and an image signal outputted to the image output section for the right-eye 110B may differ from each other in terms of content (parallax may be present between images, for example). For example, when images have parallax therebetween, the control section 230 can instruct the display apparatus 100 to display a three-dimensional image.

The control section 230 may change the content of an image signal outputted to the display apparatus 100 in accordance with an operational input. For example, the determination section 220 may notify the control section 230 that an optical image of the operation surface overlaps with no predetermined image in the image pickup area of the image pickup section 21 (determination result), and when the control section 230 is actually notified, a warning stating that there is no overlap in the image pickup area of the image pickup section 21 may be displayed in the image pickup area, whereby the warning can notifies the user that the control apparatus 200 is set to receive no operation issued through the operation surface of the operation section 210.

The detection process carried out by the determination section 220 will next be described in detail.

Figure 6:
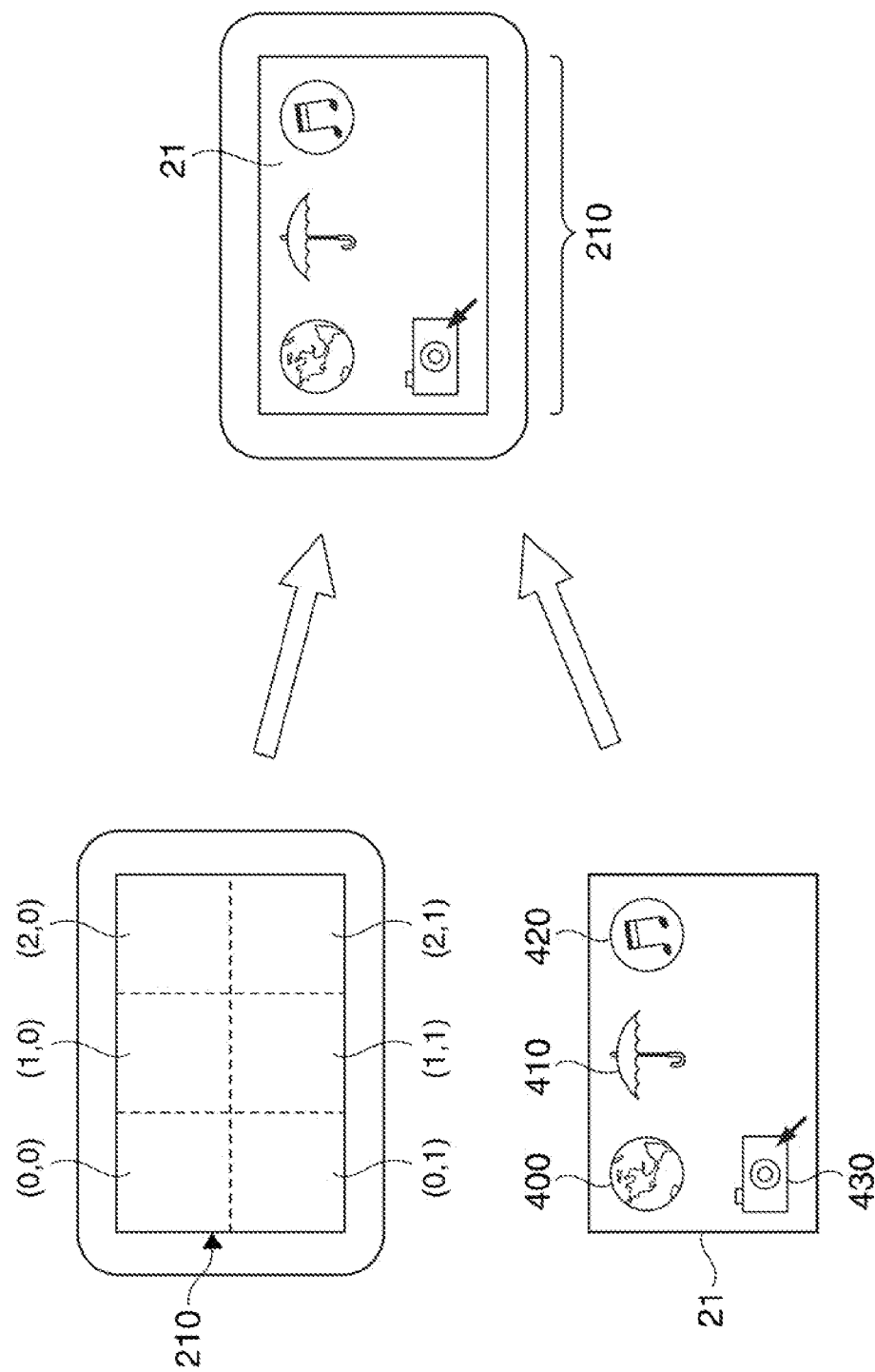
FIG. 6 shows an exemplary coordinate relationship in a case where the entire region of an operation surface is seen by a user to be superimposed on the entire region of an image pickup area in the first embodiment of the invention.

FIG. 6 shows an exemplary coordinate relationship in a case where the entire operation surface is seen by the user to be superimposed on the entire image pickup area. That is, FIG. 6 shows an exemplary coordinate relationship in a case where the four corners of the image pickup area of the image pickup section 21 are seen by the user to coincide with the four corners of the operation surface of the operation section 210. The description will be continued below by assuming that an icon image 400 and icon images 410, 420, and 430 are displayed as the predetermined image in the image pickup area of the image pickup section 21 by way of example.

In the example shown in FIG. 6, in which the entire operation surface of the operation section 210 is superimposed on the entire image pickup area of the image pickup section 21, the position of the icon image 400 is related as the overlap information to absolute coordinates (0,0) on the operation surface of the operation section 210. Further, the position of the icon image 410 is related as the overlap information to absolute coordinates (1,0) on the operation surface of the operation section 210. The position of the icon image 420 is related as the overlap information to absolute coordinates (2,0) on the operation surface of the operation section 210, and the position of the icon image 430 is related as the overlap information to absolute coordinates (0,1) on the operation surface of the operation section 210.

The determination section 220 detects the absolute coordinates (0,0), (1,0), (2,0), and (0,1) on the operation surface of the operation section 210 that are superimposed on the icon images in the image pickup area of the image pickup section 21. The determination section 220 determines to receive an operational input issued at any of the absolute coordinates on the operation surface and detected by the operation section 210.

When an operational input is issued at any of the absolute coordinates (0,0), (1,0), (2,0), and (0,1) on the operation surface of the operation section 210, the determination section 220 notifies the control section 230 of information representing the position of an icon image superimposed on the coordinates at which the operational input has been issued, whereby the control section 230 can carry out a process related to the position where the icon image is displayed and which is notified by the determination section 220.

The coordinates on the operation surface may be provided with hysteresis, whereby the determination section 220 can receive not only an operational input issued at coordinates on the operation surface but also an operational input issued at a point in the vicinity of the coordinates.

Figure 7:
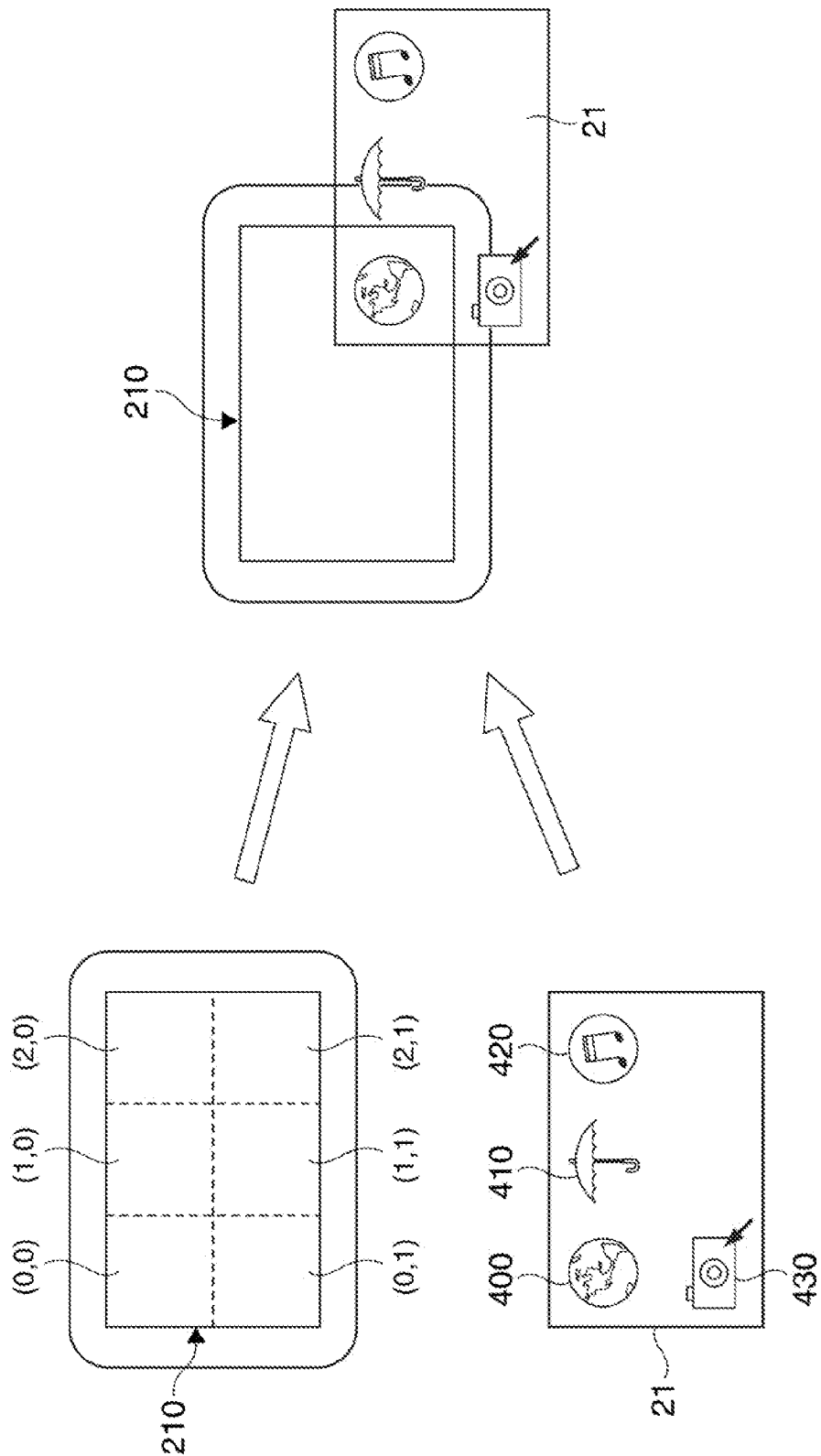
FIG. 7 shows an exemplary coordinate relationship in a case where part of the operation surface is seen by the user to be superimposed on part of the image pickup area in the first embodiment of the invention.

FIG. 7 shows an exemplary coordinate relationship in a case where part of the operation surface is seen by the user to be superimposed on part of the image pickup area. The relationship between the positions of the icon images and the positions (coordinates) on the operation surface is stored in advance in the storage section 240 for each piece of overlap information. In the example shown in FIG. 7, in which part of the operation surface of the operation section 210 is superimposed on part of the image pickup area of the image pickup section 21, the position of the icon image 400 is related to the absolute coordinates (2,1) on the operation surface of the operation section 210.

The determination section 220 detects the position in the image pickup area of the image pickup section 21 where the icon image 400 superimposed on the optical image on the operation surface of the operation section 210 is displayed and receives an operational input issued at the absolute coordinates (2,1) on the operation surface of the operation section 210 that is related to the position of the superimposed icon image 400.

Further, when an operational input is issued at the absolute coordinates (2,1) on the operation surface of the operation section 210, the determination section 220 notifies the control section 230 of the information representing the position of the superimposed icon image 400, whereby the control section 230 can carry out a process related to the position where the icon image 400 is displayed and which is notified by the determination section 220.

Figure 8:
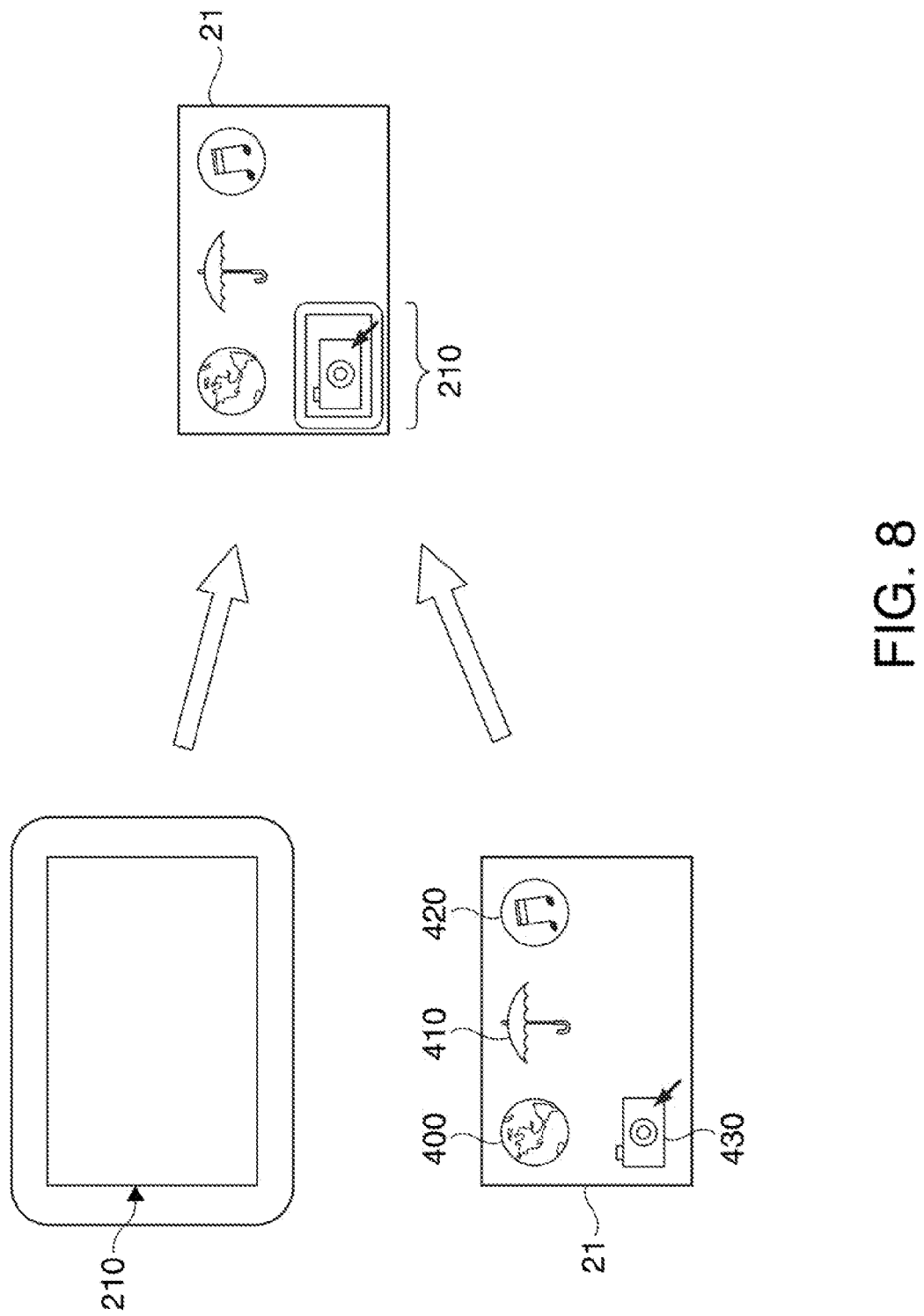
FIG. 8 shows an exemplary coordinate relationship in a case where the entire operation surface is seen by the user to be superimposed on part of the image pickup area in the first embodiment of the invention.

FIG. 8 shows an exemplary coordinate relationship in a case where the entire operation surface is seen by the user to be superimposed on part of the image pickup area. The relationship between the positions of the icon images and the positions (coordinates) on the operation surface is stored in advance in the storage section 240 for each piece of overlap information. In the example shown in FIG. 8, in which the entire operation surface of the operation section 210 is superimposed on part of the image pickup area of the image pickup section 21, the position of the icon image 430 is related to the entire operation surface of the operation section 210.

The determination section 220 detects the position in the image pickup area of the image pickup section 21 where the icon image 330 superimposed on the optical image of the operation surface of the operation section 210 is displayed and determines to receive an operational input issued at any coordinates on the entire operation surface of the operation section 210 that is related to the position of the superimposed icon image 430.

Further, when an operational input is issued through the operation surface of the operation section 210, the determination section 220 notifies the control section 230 of information representing the position of the superimposed icon image 430, whereby the control section 230 can carry out a process related to the position of the icon image 430 that is notified by the determination section 220 (process of imaging an object, for example).

Even when no icon image is displayed in a fixed position in the image pickup area of the image pickup section 21, the control section 230 may display an icon image in the fixed position in response to an action of the user superimposing the optical image of the operation surface of the operation section 210 on the fixed position.

As described above, the transmissive display apparatus includes the operation section 210, which is mobile and detects an operational input issued through the operation surface; the image generation sections 11A and 11B, which output predetermined image light (icon image light, for example), the projection optical systems 12A and 12B, and the light guide sections 20A and 20B; the image pickup section 21, which visually presents the predetermined image light in the image pickup area that transmits externally incident light; the sensor 120, which outputs a signal according to the positional relationship between the operation surface and the image pickup area (image signal carrying image of control apparatus 200 captured by sensor 120, for example); and the determination section 220, which detects overlap between an optical image of the operation surface that has passed through the image pickup area and the predetermined image light in the image pickup area based on a signal according to the positional relationship described above and receives the operational input when the optical image of the operation surface overlaps with the predetermined image light.

Is the configuration described above, the determination section 220 receives the operational input when the optical image of the operation surface overlaps with the predetermined image light. For example, the user can hold the control apparatus 200 in such a way that it overlaps with an icon image in the image pickup area of the transmissive display apparatus and operate the operation surface of the operation section 210 as if it were a touch panel, whereby the operability of the transmissive display apparatus can be improved. Further, the transmissive display apparatus can prevent any misoperation associated with an operational input using a virtual icon image.

Second Embodiment

A second embodiment of the invention will be described in detail with reference to the drawings. The second embodiment differs from the first embodiment in that light sources are provided in an enclosure of the control apparatus 200 or the display apparatus 100. Only points different from the first embodiment will be described below.

Figure 9:
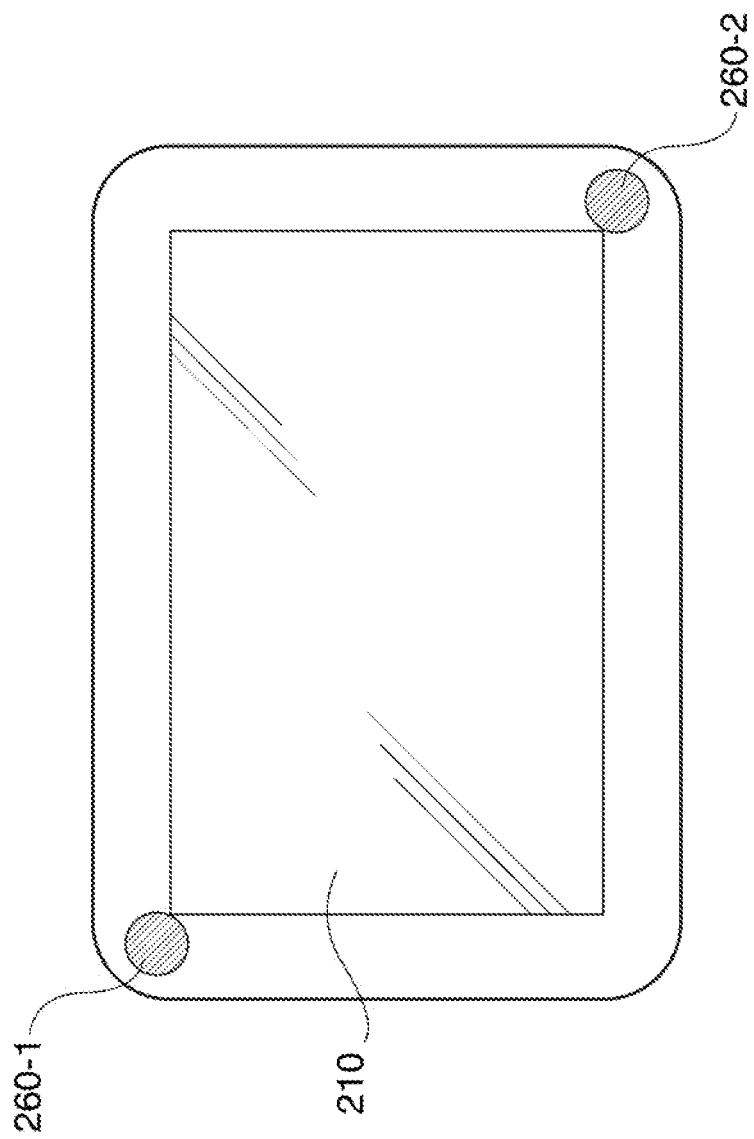
FIG. 9 shows an example of the layout of light sources provided in an enclosure of the control apparatus in a second embodiment of the invention.

FIG. 9 shows an example of the layout of light sources provided in an enclosure of the control apparatus. Light sources 260 are provided in the vicinity of corners of the operation surface and serve as marks showing the position of the operation surface of the operation section 210 of the control apparatus 200. Each of the light sources 260 emits directional infrared light in an out-of-plane direction of the operation surface. Each of the light sources 260 is, for example, a light emitting diode. The light sources 260 may be disposed at opposing corners of the operation surface of the operation section 210 as shown in FIG. 9 or may be disposed at three or four corners of the operation surface.

The sensor 120 (see FIGS. 2 and 3) receives the directional infrared light emitted from the light sources 260 and outputs a signal according to the received light (intensity of the received light, for example), that is, a signal according to the positional relationship between the operation surface of the operation section 210 and the image pickup area of the image pickup section 21. The sensor 120 is, for example a photodiode.

The sensor 120 may be provided in a plurality of positions. In this case, the sensors 120 can receive the infrared light from the light sources 260 along a plurality of directions. Further, the determination section 220 may calculate the relative distance from the operation surface of the operation section 210 to the image pickup area of the image pickup section 21 based on the received light results. The light sources 260 may alternatively be provided in the display apparatus 100. In this case, since the sensor 120 is disposed in the control apparatus 200 instead of in the display apparatus 100, the control apparatus 200 may receive the infrared light from the light sources 260 and output a signal according to the received light (signal according to positional relationship).

The determination section 220 detects overlap in the image pickup area of the image pickup section 21 based on the signal according to the light from, the light sources 260. For example, when the intensity of the received light is equal to or greater than a predetermined value, the determination section 220 determines that the entire operation surface is superimposed on the entire image pickup area of the image pickup section 21.

As described above, in the transmissive display apparatus, in which the operation section 210 or the image output section for the left eye 110A and the image output section for the right eye 110B include light sources, when the light sources are disposed in the operation section 210, the sensor 120 receives the light from the light sources on the side where the image output section for the left eye 110A and the image output section for the right eye 110B are present and outputs a signal according to the received light, whereas when the light sources are disposed in the image output section for the left eye 110A and the image output section for the right eye 110B, the sensor 120 receives the light from the light sources on the side where the operation section 210 is present and outputs a signal according to the received light, and the determination section 220 detects overlap in the image pickup area of the image pickup section 21 based on the signal according to the received light.

The configuration described above allows the determination section 220 to detect overlap in the image pickup area of the image pickup section 21 based on the signal according to the received light, whereby the operability of the transmissive display apparatus can be improved.

Third Embodiment

A third embodiment of the invention will be described in detail with reference to the drawings. The third embodiment differs from the first and second embodiments in that a key image is superimposed on an optical image of the control apparatus 200. Only points different from the first and second embodiments will be described below.

Figure 10:
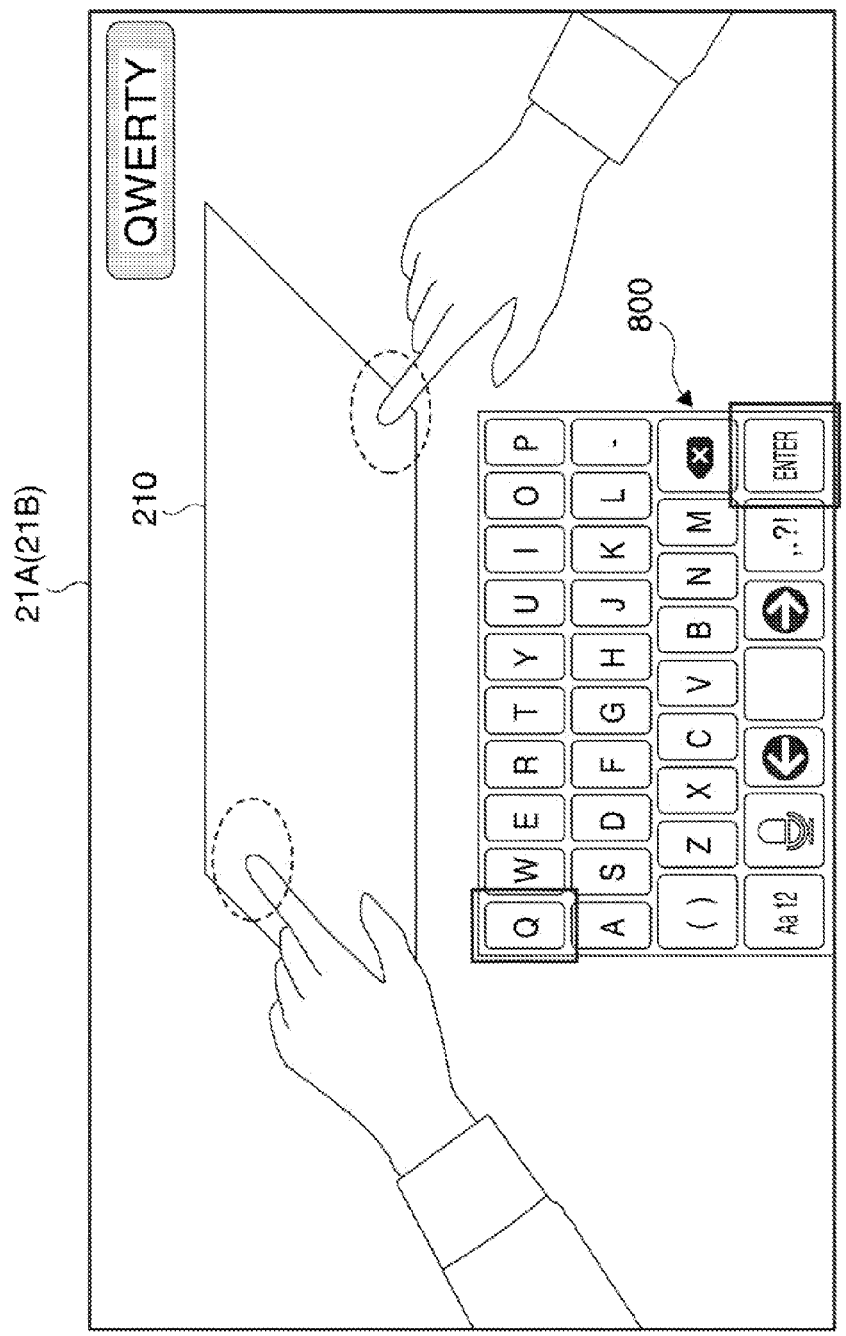
FIG. 10 shows an example of display presented, when keys are allocated on the operation surface of an operation section in a third embodiment of the invention.

FIG. 10 shows an example of display presented when keys are allocated on the operation surface of the operation, section. In FIG. 10, a menu image "QWERTY" and a key image 800 showing a key layout related to the menu image are projected in the image pickup area of the image pickup section 21. Among the keys that form the key image 800, the position of at least one predetermined, key ("Q" and "ENTER" in FIG. 10) is indicated by a frame, whereby the user can specify a position on the operation surface of the operation section 210 (coordinate reference point) to which each predetermined key indicated by the frame is related.

More specifically, assume that the user who is looking at the image pickup area of the image pickup section 21 touches with a finger the upper left corner of the operation surface of the operation section 210 in order to display the key "Q" at the upper left corner of the optical image of the operation section 210 in the image pickup area of the image pickup section 21. Further assume that the user touches with another finger the lower right corner of the operation surface of the operation section 210 in order to display the key "ENTER" at the lower right corner of the optical image of the operation section 210 in the image pickup area of the image pickup section 21. In this state, the operation section 210 detects the positions with which the fingers of the user are in contact, that is, the coordinates at which the operational inputs have been issued.

The control section 230 virtually sets the key layout on the operation surface of the operation section 210 based on the information representing the position of the key image superimposed on the coordinates at which the operational inputs have been issued. In this process, the control section 230 positions the key "Q" at the upper left corner of the operation surface of the operation section 210 with which the finger of the user is in contact and the key "ENTER" at the lower right corner of the operation surface of the operation section 210 with which the other finger of the user is in contact (positioning). The control section 230 further allocates the other keys based on the positions of the keys "Q" and "ENTER" (reference points) (allocation).

The control section 230 may alternatively position the key "Q" at the upper left corner of the operation surface of the operation section 210 and the key "ENTER" at the lower right corner of the operation surface of the operation section 210 (positioning) not based on the coordinates at which the operational inputs have been issued but based on an image signal carrying an image of the operation section 210. The control section 230 further allocates the other keys (allocation) based on the thus positioned keys "Q" and "ENTER" (reference points).

The display apparatus 100 may project another image (image showing a region where an operationally inputted character string is displayed, for example) in the image pickup area of the image pickup section 21 in such a way that the other image does not overlap with the key image showing the key layout. Further, the display apparatus 100 may adjust the size of the key image based on a user's operational input (mode specification) before displaying the key image.

Figure 11:
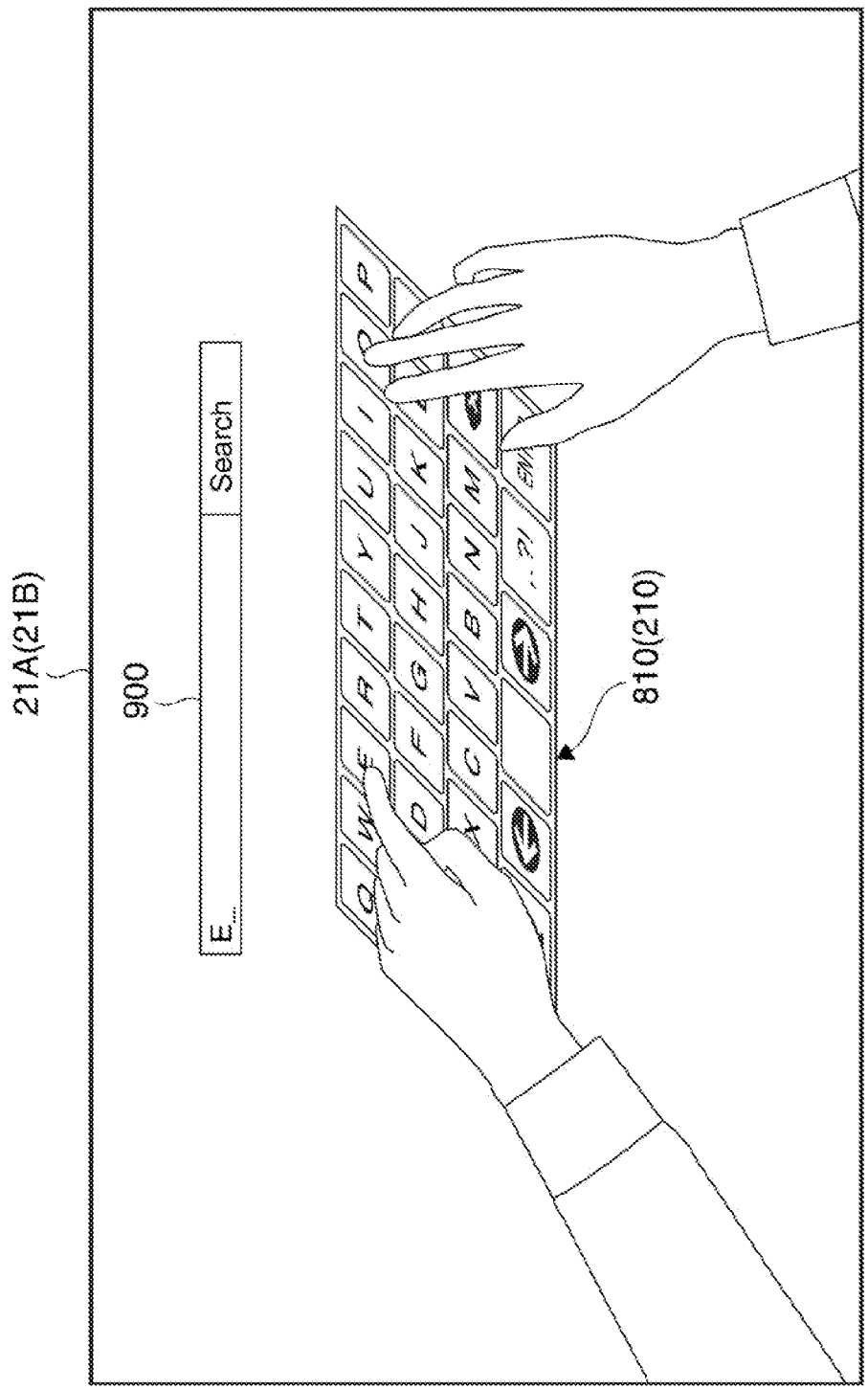
FIG. 11 shows an example of display presented when a key image is superimposed on an optical image of the operation section in the third embodiment of the invention.

FIG. 11 shows an example of display presented when a key image is superimposed on an optical image of the operation section. The control section 230 deforms a key image 810 acquired from the storage section 240 as required based, on the image signal carrying the image of the operation section 210 in such a way that the size and shape of the optical image of the operation section 210 and the size and shape of the key image 810 agree with each other in the image pickup area of the image pickup section 21. For example, the control section 230 may deform the key image 810 into a shape seen in a perspective view.

FIG. 11 shows a state in which user's operation of a key "E" displays an operationally inputted character "E" on an operationally inputted image 900. For example, the control section 230 may search the character string operationally inputted as described above over a computer network.

Some embodiments of the invention have been described in detail with reference to the drawings. It is noted that the specific configurations in the embodiments are not necessarily employed and other designs and configurations fall within the scope of the invention to the extent that they do not depart from the substance thereof.

For example, the control apparatus 200 may include a sensor (gyro sensor, for example) that detects the attitude (such as rotation) of the control apparatus 200. The control section 230 may display a predetermined image (icon image, for example) in the image pickup area of the image pickup section 21 (see FIG. 3) with the orientation of the displayed image aligned with the detected attitude of the control apparatus 200.

Further, for example, when an optical image of the operation surface does not overlap with a predetermined image in the image pickup area of the image pickup section 21, the operation section 210 may detect the position on the operation surface with which a pointing object is in contact in the form of relative coordinates on the operation surface.

Further, for example, the projection optical system, the light guide section, and the image pickup section in the display apparatus 100 may be replaced with a pupil-division see-through optical system or a half-silvered-mirror-based see-through optical system. Moreover, for example, the display apparatus 100 may not necessarily include the projection optical system, the light guide section, or the image pickup section but may instead include the optical system provided in the image display apparatus (JP-A-2008-20770), the head mounted display (Japanese Patent No. 4,636,164), the beam-scan display apparatus (International Publication No. 2009/041055), or the display apparatus (Japanese Patent No. 4,055,283).

A program for implementing the transmissive display apparatus described, above may be recorded on a computer readable recording medium, and the program may then be read and executed by a computer system. The term "computer system" used herein is intended to encompass an OS, a peripheral device, and other hardware components. Further, the term "computer readable recording medium" used herein means a flexible disk, a magneto-optical disk, a ROM, a CD-ROM, and other mobile media, a hard disk drive and other storage devices built in the computer system. The term "computer readable recording medium" used herein is further intended to encompass a component that holds a program for a fixed period, such as a volatile memory (RAM) in a computer system that works as a server or a client when a program is transmitted over the Internet or any other network or a telephone circuit or any other communication circuit. The program may alternatively be transmitted from a computer system including a storage device or any other component that stores the program to another computer system via a transmission medium or a transmission wave traveling through a transmission medium. The term "transmission medium" used herein, through which the program is transmitted, means a medium having a function of transmitting information, such as the Internet and other networks (communication networks) and a telephone circuit and other communication circuits (communication lines). The program described above may alternatively implement part of the function described above. The program may still alternatively implement the function described above when combined with a program having already been, stored in a computer system, what is called a difference file (difference program).

The entire disclosure of Japanese Patent Application No. 2011-258699, filed Nov. 28, 2011 is expressly incorporated by reference herein.

What is claimed is:

1. A transmissive display apparatus comprising:
    a mobile operation section that detects an operational input issued through an operation surface;
    an image output section that outputs predetermined image light;
    an image pickup section that visually presents the predetermined image light in an image pickup area that transmits externally incident light;
    a sensor that outputs a signal according to a positional relationship between the operation surface and the image pickup area; and
    a determination section that detects overlap between an optical image of the operation surface that has passed through the image pickup area and the predetermined image light in the image pickup area based on the signal according to the positional relationship and receives the operational input when the optical image of the operation surface overlaps with the predetermined image light,
    wherein the mobile operation section or the image output section includes a light source, the light source being disposed in at least one corner of the operation surface of the operation section,
    when the light source is provided in the operation section, the sensor receives light from the light source on the side where the image output section is present and outputs a signal according to the received light, whereas when the light source is provided in the image output section, the sensor receives light from the light source on the side where the operation section is present and outputs a signal according to the received light, and
    the determination section detects overlap in the image pickup area based on the signal according to the received light.

2. The transmissive display apparatus according to claim 1, wherein the determination section detects overlap between the optical image of the operation surface and the predetermined image light and receives the operational input issued by using the overlap.

3. The transmissive display apparatus according to claim 1, wherein the determination section determines whether or not the operation surface faces the image pickup area based on the signal according to the positional relationship and receives the operational input when the operation surface faces the image pickup area.

4. The transmissive display apparatus according to claim 1, wherein the sensor captures an image of the operation surface, and
    the determination section detects overlap in the image pickup area based on the image of the operation surface captured by the sensor.

5. The transmissive display apparatus according to claim 1, wherein the operation section is a track pad.

6. The transmissive display apparatus according to claim 1, further comprising:
    a projection optical system that projects the predetermined image light; and a light guide section that guides the predetermined image light projected through the projection optical system to the image pickup area, wherein the determination section detects overlap viewed from an observation position between the optical image of the operation surface and the predetermined image light guided through the light guide section and receives the operational input issued by using the overlap.

7. An operation input method used with a transmissive display apparatus, the method comprising:

outputting predetermined image light by using an image output section;

visually presenting the predetermined image light in an image pickup area that transmits externally incident light by using an image pickup section;

outputting a signal according to a positional relationship between the operation surface and the image pickup area by using a sensor;

detecting an operational input issued through the operation surface by using a mobile operation section; and detecting overlap between an optical image of the operation surface that has passed through the image pickup area and the predetermined image light in the image pickup area based on the signal according to the positional relationship and receiving the operational input when the optical image of the operation surface overlaps with the predetermined image light by using a determination section, wherein the mobile operation section or the image output section includes a light source, the light source being disposed in at least one corner of the operation surface of the operation section, when the light source is provided in the operation section, the sensor receives light from the light source on the side where the image output section is present and outputs a signal according to the received light, whereas when the light source is provided in the image output section, the sensor receives light from the light source on the side where the operation section is present and outputs a signal according to the received light, and the determination section detects overlap in the image pickup area based on the signal according to the received light.

* * * * *